United States Patent [19]

Lisec

[11] 4,434,024
[45] Feb. 28, 1984

[54] DEVICE FOR ASSEMBLING INSULATING GLASS PANES

[76] Inventor: Peter Lisec, Postfach 21, A-3363 Amstetten-Hausmening (N.Ö.), Austria

[21] Appl. No.: 365,266

[22] Filed: Apr. 5, 1982

[30] Foreign Application Priority Data

Apr. 3, 1981 [AT] Austria ............................. 41562/81

[51] Int. Cl.³ ...................... B65H 29/20; B32B 31/00
[52] U.S. Cl. ..................................... 156/556; 29/705; 29/714; 29/715; 156/99; 156/107; 156/292
[58] Field of Search ................ 29/281.1, 281.2, 281.3, 29/281.4, 281.5, 281.6, 705, 714, 715; 156/99, 107, 292, 556

[56] References Cited

U.S. PATENT DOCUMENTS

| 2,920,989 | 1/1960 | Cochran et al. | 156/556 |
| 3,518,137 | 6/1970 | Hamilton | 156/556 |
| 3,851,684 | 12/1974 | Wyrick | 29/462 |

FOREIGN PATENT DOCUMENTS

| 2820630 | 2/1979 | Fed. Rep. of Germany. | |
| 2801093 | 7/1979 | Fed. Rep. of Germany | 29/714 |
| 2735039 | 6/1981 | Fed. Rep. of Germany. | |
| 54-37973 | 3/1979 | Japan | 29/281.1 |
| 865593 | 9/1981 | U.S.S.R. | 29/715 |
| 871919 | 10/1981 | U.S.S.R. | 29/715 |

Primary Examiner—Charlie T. Moon
Assistant Examiner—R. S. Wallace
Attorney, Agent, or Firm—Young & Thompson

[57] ABSTRACT

A device for the assembly of insulating glass panes comprises an upright wall equipped with supporting rollers, the lower edge of this wall being provided with driven conveying rollers for glass panes, and a carrier with guide rollers for glass panes movable into or out of the upper zone of the glass panes. The wall can be shifted forward and backward at right angles to its plane by at least the thickness of one glass pane with its spacer frame attached thereto, transversely to the conveying direction of the glass panes. A beam liftable and lowerable underneath the wall carries lifting lugs and guide rollers engaging between the conveying rollers. Furthermore, a measuring device at least partially fixedly mounted on the framework is provided, for example a photoelectric cell, to detect the thickness of a glass pane with its spacer frame attached thereto and to shift the wall backward by this amount.

4 Claims, 3 Drawing Figures

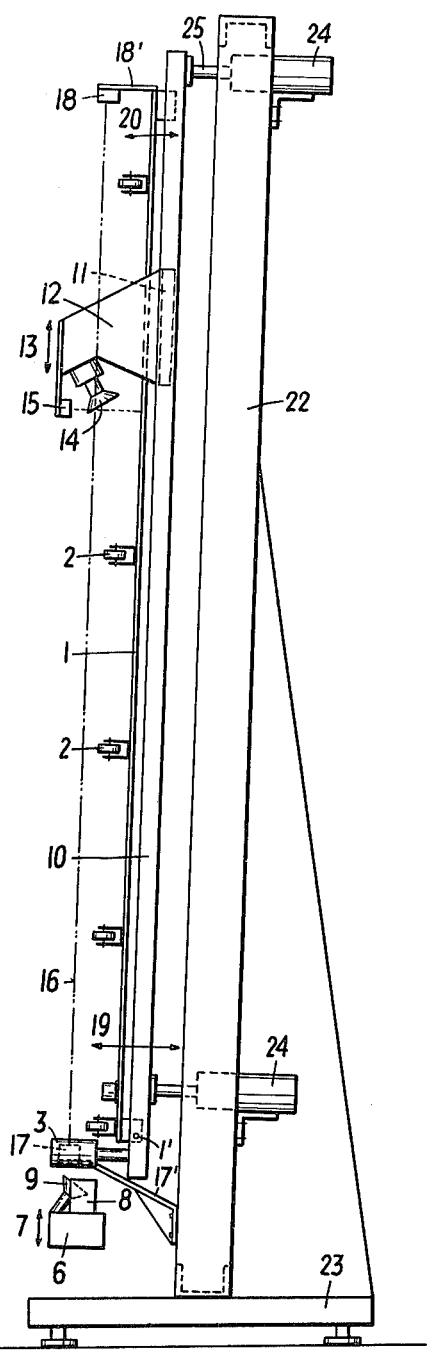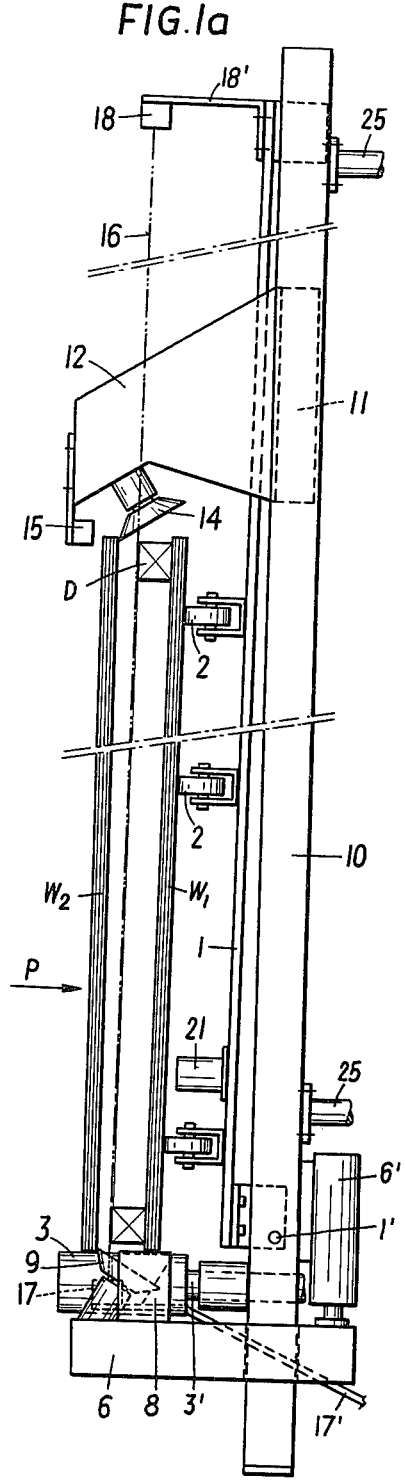

DEVICE FOR ASSEMBLING INSULATING GLASS PANES

The invention relates to a device for assembling insulating glass panes, more particularly of the type comprising an upright wall equipped with supporting rollers, the lower edge of this wall being provided with driven conveying rollers for glass panes, and with a carrier with guide rollers for glass panes movable into or out of the upper zone of the glass panes, wherein the wall can be shifted forward and backward at right angles to its plane at least by the thickness of one glass pane with its spacer frame attached thereto, transversely to the conveying direction of the glass panes.

Such a device is disclosed in German DOS No. 2,820,630. In this conventional device, problems were sometimes encountered when assembling especially large and thus heavy insulating glass elements and in connection with the mutually independent conveying elements for the glass panes arranged in the conventional device at the lower edge of the upright wall. These conveying elements consist of split conveyor rollers; and the glass panes would sometimes enter the gap between the conveyor rollers, thus causing trouble.

The invention has as its object the further improvement of the assembling devices of the type described hereinabove.

This is achieved by providing a beam which is liftable and lowerable at the bottom of the wall, this beam carrying lifting cams for one glass pane engaging between the conveying rollers and guide rollers for another glass pane; and by providing a measuring means, at least partially fixedly mounted on the framework of the device, for example a photoelectric cell, to detect the thickness of a glass pane with its spacer frame attached thereto.

Therefore, the device of this invention makes do with only one set of conveying rollers, since the first glass pane conveyed into the device can be lifted by means of the lifting cam off the conveying rollers to such an extent that these rollers are just out of engagement with the glass pane. Due to the fact that a measuring device is provided for detecting the thickness of the first glass pane with its attached spacer frame present in the arrangement, it is ensured that the wall is displaced precisely by only such an amount in the rearward direction as is absolutely necessary, whereby the working cycle periods during assembly of insulating glass can be substantially shortened. The second glass pane, after setting back the wall with the first glass pane, is conveyed on the conveying rollers also used for transporting the first glass pane essentially in the same plane as the latter, guided by the upper guide rollers provided on the carrier and by the lower guide rollers associated with the beam, into the device until it has reached its end position wherein it is exactly congruent with the first glass pane. After lowering the beam with the lifting cams and the guide rollers and lifting the carrier with the upper guide rollers, both glass panes, with the spacer frame arranged therebetween, can be moved out of the device.

It can be seen that a rapid operation is possible by means of the device of this invention, and that, in particular, the second glass pane during transport into the device is touched on its surface, which is on the inside in the finished insulating glass element, only at the upper and lower edges thereof.

In a practical embodiment, the light source or receiver is arranged fixedly on the framework between the conveying rollers, and the light source or receiver is disposed at the upper edge of the wall. This arrangement makes it possible reliably to detect the thickness of the glass pane with the spacer frame attached thereto, so that safe operation is ensured. In this connection, the arrangement is preferably such that the light source is arranged fixedly on the framework at the bottom, while the receiver is attached to the upper edge of the wall.

Another problem arising in the conventional devices for the assembly of insulating glass panes is that the glass panes sag somewhat when transported into the device, especially if they are supported only at their upper and lower marginal zones and relatively large glass panes are involved. This is so, because the glass panes are transported in a position wherein they are rearwardly inclined by about 5°. Consequently, it sometimes happens that the second glass pane sags to such a degree that it abuts against the spacer frame of the first glass pane and/or damages the sealing or adhesive compound applied to the spacer frame. To overcome this problem, provision is made by this invention that the wall can additionally be tilted about a lower horizontal axis. Of course, it would also be possible to move the wall bodily farther toward the rear, but this would take longer than a combined displacement and tilting movement as in the present invention. The extent of tilting depends on the vertical position of the carrier with the upper guide rollers, which position is dependent on the size of the glass. The higher this carrier is disposed in its operative position, the farther is the wall tilted rearwardly.

Frustoconical guide rollers with axes inclined with respect to the conveying plane have proven to be especially suitable. These guide rollers engage the glass panes only with their larger peripheral edge so that contamination by dirt is practically impossible.

A proximity switch, for example a capacitive switch, can be provided in the region of the end of the wall on the delivery side, associated with a first timer unit triggering a reduction in the conveying speed of the conveying rollers and with a second timer switch unit triggering the lifting of the beam as well as the rearward displacement and optionally the tilting of the wall. In this way, the device can be operated in a fully automated fashion.

Additional details and features of the invention can be seen from the following description of the embodiment which is schematically illustrated in the drawings, wherein:

FIG. 1 is a side elevational view of apparatus according to the present invention;

FIG. 1a is an enlarged view of a portion of FIG. 1; and

Figure 2:
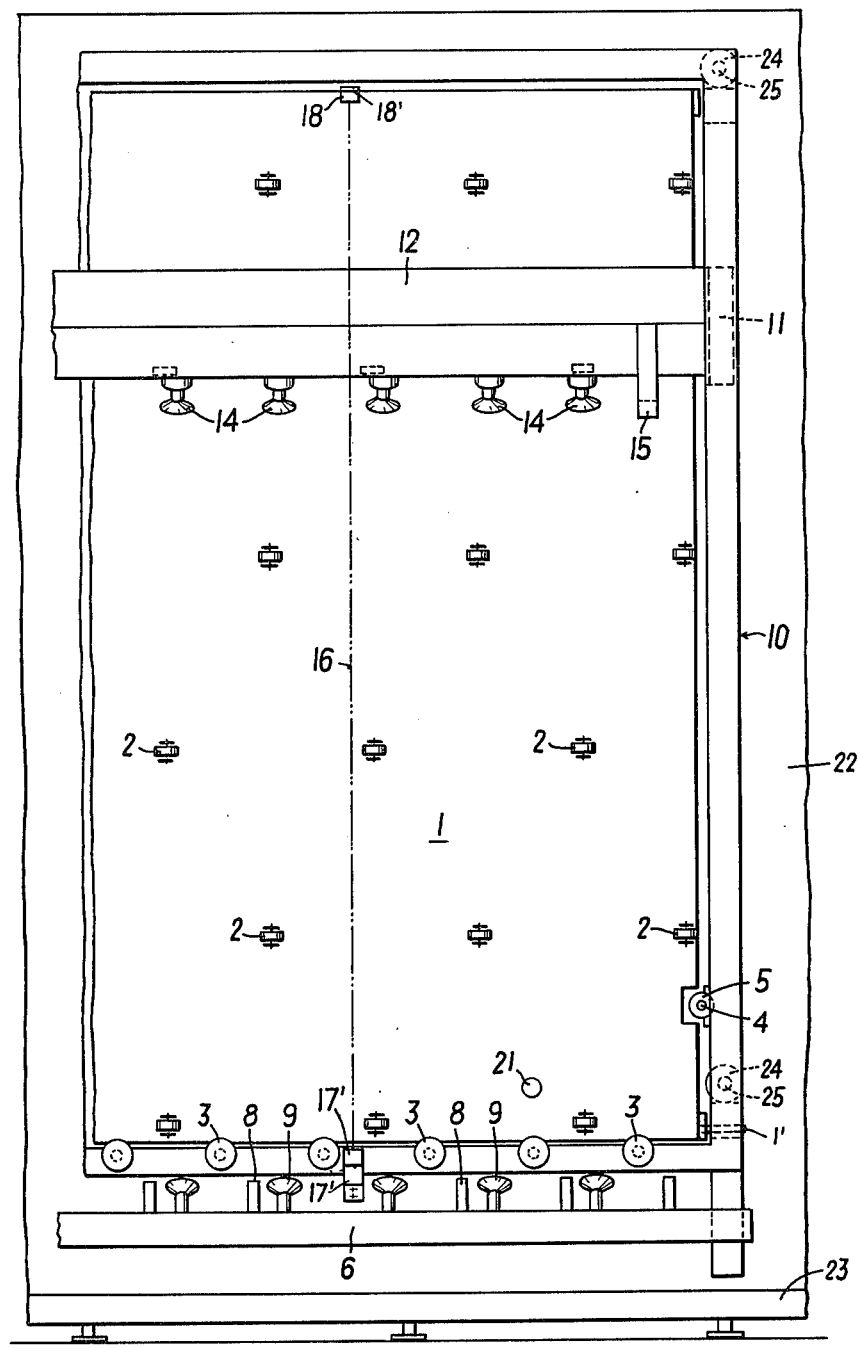
FIG. 2 is a front elevational view taken from the left of FIG. 1.

Before describing the embodiment shown in the drawings in detail, it is to be noted that only the components essential to the invention have been illustrated.

The device comprises a stand 22 resting on the floor via its base 23 and feet (FIG. 1).

A wall 1 is supported on stand 22; and a plurality of supporting rollers 2 are freely rotatable about upright axes and are carried by the front of wall 1. Conveying rollers 3 drivable by drive shafts 3'0 by means of a conventional drive mechanism (not shown) are arranged at the lower edge of wall 1. Glass panes $W_1$ can be conveyed on these conveying rollers 3 while in contact with the supporting rollers 2 until they reach the final position defined by an end stop 4 (see FIG. 2) arranged on one side of wall 1. The end stop 4 can be retracted from its operative position by means of a pressure medium cylinder 5 to remove assembled insulating glass panes.

The supporting rollers 2 can also be arranged along the wall 1 in such a way that the density of the supporting rollers 2 along the wall 1 decreases in the upward direction.

Below wall 1, a beam 6 is disposed, which is movable upwardly and downwardly by means of lifting cylinders 6' (FIG. 1a) in the direction of the double arrow 7 (FIG. 1). The beam 6 is guided on guide rails 10 and carries on its upper side lifting lugs 8 and guide rollers 9. The guide rollers 9 are of a frustoconical shape and are freely rotatable about inclined axes, these axes being inclined in such a way that the guide rollers 9 contact glass panes $W_2$ only with the rim of the base of the conical roller (FIG. 1a). As can be seen especially from FIG. 2, the lifting lugs 8 and the guide rollers 9 are arranged in such a way that they enter in between the conveying rollers 3 during lifting of the beam 6. It is, of course, also possible to locate the beam 6 so that the lifting lugs 8 and the guide rollers 9 are initially disposed between the conveying rollers 3 but wherein their effective surfaces lie below the track defined by the conveying rollers when the beam 6 is in its rest or lower position.

Guide rails 10 are arranged on both sides of the wall 1, and are supported by the stand 22 and are engaged by guide means 11 for a carrier 12. The carrier 12 is movable upwardly and downwardly by a conventional drive mechanism, not shown, in the direction of the arrow 13 (FIG. 1). Guide rollers 14 similar to the guide rollers 9 are mounted on the carrier 12. Additionally, the carrier 12 is provided with a measuring feeler 15, for example a capacitive proximity switch.

Furthermore, a photoelectric cell is arranged in the device, the path of whose beam is indicated by a dot-dash line 16 in the drawings. The light source 17 for this beam 16 is mounted by a holder 17' fixedly on the stand 22 between the conveying rollers 3, whereas the receiver 18 of the light beam 16 is attached by a support 18' to the upper edge of the wall 1.

The double arrows 19 and 20 (FIG. 1) indicate that the wall 1, which, just as the guide rails 10 are arranged to be rearwardly inclined with respect to the perpendicular by a few degrees (for example 5°), can be displaced forward and backward at right angles to the conveying plane of the glass panes $W_1$ and $W_2$ by pressure medium cylinders 24 by way of piston rods 25. Furthermore, as indicated by arrow 20, the wall 1 is adapted to be tiltable about a lower horizontal axis parallel to the conveying direction about bearings 1' with respect to the guide elements 10.

A measuring feeler 21 is additionally provided in the region of the end of the wall 1 on the delivery side. Two timer switch units are associated with this measuring feeler, the purpose and function of these units being described below.

The mode of operation of the above-disclosed device is as follows:

Initially, the device is in the starting position shown in FIG. 1, i.e. the wall 1 is shifted forward into its foremost position and the beam 6 is lowered. The beam 12 is likewise in its waiting position at the upper edge of the wall 1.

A glass pane $W_1$, to which can be already attached a spacer frame D coated with an adhesive or sealing compound on both sides (FIG. 1a), is conveyed on the conveying rollers 3 and in contact with the supporting rollers 2 into the device from the left as seen in FIG. 2. As soon as the glass pane $W_1$ reaches the measuring feeler 21 which can be, for example, a conventional capacitive proximity switch, the conveying speed of the conveying rollers 3 is reduced by way of a conventional timer switch unit (not shown). Furthermore, a second conventional timer switch unit (not shown) is triggered which initiates, after a predetermined time delay, the lifting of the beam 6 as well as the rearward movement and tilting of the wall 1.

The glass pane $W_1$ with the spacer frame D attached thereto next reaches the end stop 4, and the wall 1 moves rearwardly unitl the light beam 16 is no longer interrupted by the spacer frame D. At the same time, the beam 6 moves upwardly to such a degree that the lifting lugs 8 just lift the glass pane $W_1$ off the conveying rollers 3. Additionally, the carrier 12 moves downwardly until its measuring feeler 15 detects the upper edge of the first glass pane $W_1$ with the spacer frame D, which pane is in its final position. At this point, a second glass pane $W_2$ is guided, on the conveying rollers 3, into the device by guide rollers 14 and 9 along its outer upper and lower edges, respectively, until it reaches its end position wherein it is congruent with the first glass pane $W_1$, i.e. until it abuts the end stop 4. As sonn as this end position has been reached, the beam 6 moves downwardly and the carrier 12 is lifted so that the second glass pane $W_2$ comes into contact with the spacer frame D by movement in the direction of arrow P (FIG. 1a). At this point, the end stop 4 is moved out of its operative position by actuating the pressure medium cylinder 5, and the conveying rollers 3 transport the thus-assembled insulating glass pane out of the device. Thereupon, the wall 1 returns to its starting position, i.e. its forwardmost end position, and the device is ready for a new operating cycle.

It is also possible by means of the device of this invention to assemble multiple insulating glass panes in a fully automatic fashion. For this purpose, it is merely necessary to attach likewise a spacer frame to the second glass pane $W_2$ conveyed into the device, on its side facing away from the wall 1. Controlled by the light beam 16, the wall 1 is shifted rearwardly in correspondence with the thickness of the second glass pane with its spacer frame, so that, in turn, a third glass pane, supported by the guide rollers 9 and 14, can be transported into the device.

What is claimed is:

1. Device for the assembly of insulating glass panes, comprising an upright wall, a plurality of supporting rollers carried by the wall, driven conveying rollers for glass panes adjacent the lower edge of the wall, and a carrier with guide rollers thereon for glass panes movable into or out of the upper zone of the glass pane; the improvement comprising a horizontal beam (6) adjacent the lower edge of the wall, means to raise and lower said beam, lifting cams (8) and guide rollers (9) carried by the beam and engaging between said driven conveying rollers (3); measuring means (16, 17, 18) for detecting the thickness of a glass pane ($W_1$) with a spacer frame (D) attached thereto, and means responsive to said measuring means for moving said wall backward transverse to the conveying direction and in a direction perpendicular to said wall by a distance equal to said thickness thereby to permit a further glass pane ($W_2$) to be advanced by said driven conveying rollers into overlying relationship with the first-mentioned glass pane ($W_1$).

2. Device according to claim 1, characterized in that the measuring means comprises a photoelectric cell having a light source (17) and a receiver (18) for the light, the light source (17) or the receiver (18) being arranged fixedly on the framework between the conveying rollers (3), and the other of the receiver (18) or the light source (17) being arranged on the upper edge of the wall (1).

3. Device according to claim 1, characterized in that the wall (1) is additionally tiltable (arrow 20) about a lower horizontal axis (1').

4. Device according to claim 1, characterized in that the guide rollers (9, 14) are of a frustoconical shape and have axes inclined toward the conveying plane.

* * * * *